US008815445B2

United States Patent
Sugiura et al.

(10) Patent No.: US 8,815,445 B2
(45) Date of Patent: Aug. 26, 2014

(54) CATHODE ACTIVE MATERIAL FOR LITHIUM SECONDARY BATTERY

(75) Inventors: Ryuta Sugiura, Toyohashi (JP); Nobuyuki Kobayashi, Nagoya (JP); Tsutomu Nanataki, Toyoake (JP)

(73) Assignee: NGK Insulators, Ltd., Nagoya (JP)

( * ) Notice: Subject to any disclaimer, the term of this patent is extended or adjusted under 35 U.S.C. 154(b) by 80 days.

(21) Appl. No.: 13/431,062

(22) Filed: Mar. 27, 2012

(65) Prior Publication Data

US 2012/0264021 A1    Oct. 18, 2012

Related U.S. Application Data (60) Provisional application No. 61/476,482, filed on Apr. 18, 2011.

(51) Int. Cl.
*H01M 4/13* (2010.01)
*H01M 4/24* (2006.01)

(52) U.S. Cl.
CPC .................................... *H01M 4/24* (2013.01)
USPC ........ 429/217; 429/209; 429/231.8; 429/232; 429/236

(58) Field of Classification Search
None
See application file for complete search history.

(56) References Cited

U.S. PATENT DOCUMENTS

| 5,789,114 A * | 8/1998 | Adachi et al. ................. 429/232 |
| 2006/0141361 A1 | 6/2006 | Yuasa et al. |
| 2008/0014501 A1 * | 1/2008 | Skotheim et al. ............. 429/213 |
| 2008/0206639 A1 * | 8/2008 | Kurihara ....................... 429/209 |

FOREIGN PATENT DOCUMENTS

| JP | 2000-082464 A1 | 3/2000 |
| JP | 0082464 A * | 3/2000 |
| JP | 2006-164859 A1 | 6/2006 |
| JP | 2009-117241 A1 | 5/2009 |
| JP | 2009-152037 A1 | 7/2009 |
| JP | 2010-080426 A1 | 4/2010 |
| JP | 2010-232091 A1 | 10/2010 |

* cited by examiner

*Primary Examiner* — Milton I Cano
*Assistant Examiner* — Wojciech Haske
(74) *Attorney, Agent, or Firm* — Burr & Brown, PLLC (57) ABSTRACT

Provided is a cathode active material for a lithium secondary battery, which can achieve both of excellent rate characteristic and practically sufficient durability (cycle characteristic) in the lithium secondary battery. The cathode active material for a lithium secondary battery includes therein pores. A particle or film of the cathode active material for a lithium secondary battery has formed therein a large number of pores. The inner wall of each of such pores is coated with a conductive film.

8 Claims, 5 Drawing Sheets

CATHODE ACTIVE MATERIAL FOR LITHIUM SECONDARY BATTERY

BACKGROUND OF THE INVENTION

1. Field of the Invention

The present invention relates to a cathode active material for a lithium secondary battery (hereinafter, sometimes referred to as "lithium ion secondary battery").

2. Description of the Related Art

Various attempts at configurations of a cathode active material have been made to improve battery characteristics of a lithium secondary battery (see, for example, Japanese Patent Application Laid-open No. 2009-117241 and Japanese Patent Application Laid-open No. 2010-232091).

SUMMARY OF THE INVENTION

However, none of the conventional technologies has yet achieved both of excellent rate characteristic (high rate characteristic) and practically sufficient durability (cycle characteristic). The present invention has been made to deal with such problem.

A cathode active material for a lithium secondary battery of the present invention includes therein pores. That is, a particle or film of the cathode active material for a lithium secondary battery of the present invention has formed therein a large number of pores. A feature of the present invention resides in that the inner wall each of such pores is coated with a conductive film.

The amount of the conductive film preferably falls within the range of 0.01 to 5 wt % based on the cathode active material. On account of this, an effect of imparting conductivity is satisfactory attained. Additionally, permeability of lithium ions should not be inhibited by the content of the conductive film. Therefore, satisfactory rate and cycle characteristics are both provided.

Typically, the conductive film contains a conducting substance (a substance for imparting conductivity to the conductive film) and an organic binder. In this case, the organic binder content of the conductive film preferably falls within the range of 1 to 60 wt %. On account of this, the effect of imparting conductivity is satisfactory maintained. Additionally, permeability of lithium ions should not be inhibited by the content of the organic binder. Therefore, satisfactory rate and cycle characteristics are both provided.

An average thickness of the conductive film preferably falls within the range of 30 to 1000 nm. On account of this, an effect of imparting conductivity is satisfactory attained. Additionally, permeability of lithium ions should not be inhibited by the average thickness of the conductive film. Therefore, satisfactory rate and cycle characteristics are both provided.

A carbon component as the conducting substance is preferably fibrous. In this case, fibrous carbon contents as the conducting substances become entwined with each other. Then shape holding performance of the conductive film should be enhanced. As a result, cycle characteristic should be improved.

The conducting substance is preferably a carbon having crystallinity. The crystalline carbon is an aggregate of fine crystals. Therefore, the change in volume of the cathode active material due to charge and discharge should be more lessened and then cycle characteristic should be more enhanced by using the crystalline carbon than using an amorphous carbon.

When the cathode active material for a Lithium secondary battery of the present invention is particulate or filmy, coverage of outer surface of a particle or film is preferably 50% or less. In this configuration, permeability of lithium ions should not be inhibited. Therefore, satisfactory rate characteristic is provided.

An opening of the pore may be covered by the conductive film. In this case, a proportion of the pores whose openings are covered by the conductive film based on the total number of the numerous pores preferably falls within the range of 1 to 50%. On account of this, shape holding performance of the conductive film is enhanced with preventing degradation of diffusion of lithium ions. Therefore, satisfactory rate and cycle characteristics are both provided.

In such configuration, the inner wall of each of the pores formed in the cathode active material is coated with the conductive film, which is a continuous film having conductivity, and hence the conductivity of the entirety of the cathode active material (the particle or film) is ensured. Thus, rate characteristic is improved.

Further, a stress, which is generated in the cathode active material by expansion and contraction of a crystal lattice due to intercalation and deintercalation of lithium ions in a cycle of charge and discharge, is released satisfactorily (uniformly) through the pores. This suppresses the occurrence of a crack in the cathode active material to the greatest possible extent. It should be noted that, even when a crack occurs in the cathode active material by expansion and contraction (change in volume) of a crystal lattice due to intercalation and deintercalation of lithium ions in a cycle of charge and discharge, the occurrence of a portion that is electrically isolated and thus cannot contribute to charge and discharge is suppressed to the greatest possible extent by the presence of the conductive film. Thus, a reduction in capacity is suppressed to the greatest possible extent, and satisfactory cycle characteristic is provided as well.

When the abundance of the pores (i.e., porosity) in the cathode active material is too low, an effect of releasing an internal stress through the pores and an effect of improving internal conductivity of the cathode active material by the conductive film may be lessened, resulting in reductions in rate characteristic and cycle characteristic. On the other hand, when the porosity is too high, the number of the pores each having an irregular shape may increase, which makes it difficult to form the conductive film uniformly and continuously, resulting in reductions in rate characteristic and cycle characteristic. In this regard, the porosity of the cathode active material may suitably fall within the range of 3 to 30% (typically, around 20%) (provided that the present invention is not limited to the porosity within the range).

DETAILED DESCRIPTION OF THE INVENTION

Hereinafter, preferred embodiments of the present invention are described by way of examples and comparative examples. It should be noted that the following descriptions of the embodiments are merely the specific descriptions of exemplary embodiments of the present invention, which are tentatively considered to be the best modes at the time of filing of the present application, made to a possible extent in order to fulfill description requirements (such as a descriptive requirement and an enabling requirement) for the specification required by law.

Thus, as described later, it is quite natural that the present invention is by no means limited to specific configurations of embodiments and examples to be described below. Examples of various modifications that can be made to the embodiments and examples are collectively described at the end to a maximum possible extent because insertion thereof into the descriptions of the embodiments disturb understanding of consistent descriptions of the embodiments.

1. Schematic Configuration of Lithium Secondary Battery

Figure 1A:
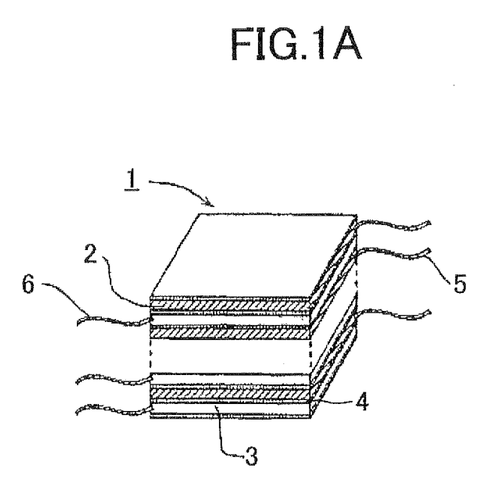
FIG. 1A is a sectional view illustrating the schematic configuration of an exemplary lithium secondary battery to which one embodiment of the present invention is applied.

FIG. 1A is a sectional view illustrating the schematic configuration of an exemplary lithium secondary battery 1 to which one embodiment of the present invention is applied. Referring to FIG. 1A, the lithium secondary battery 1 is the so-called liquid-type battery and includes cathode plates 2, anode plates 3, separators 4, cathode tabs 5, and anode tabs 6.

The separator 4 is provided between the cathode plate 2 and the anode plate 3. That is, the cathode plate 2, the separator 4, and the anode plate 3 are stacked in this order. The cathode tabs 5 are electrically connected to the cathode plates 2. Similarly, the anode tabs 6 are electrically connected to the anode plates 3.

The lithium secondary battery 1 illustrated in FIG. 1A is configured such that a stack of the cathode plates 2, the separators 4, and the anode plates 3, and an electrolytic solution containing a lithium compound as an electrolyte are liquid-tightly sealed in a specific cell casing (not shown).

Figure 1B:
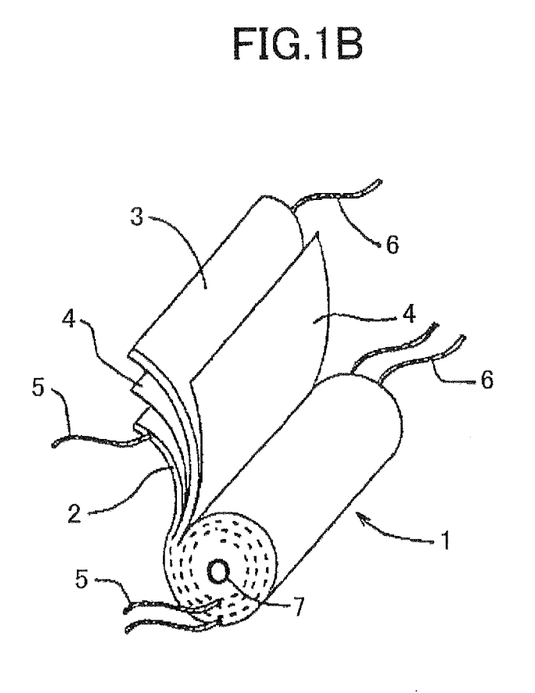
FIG. 1B is a perspective view illustrating the schematic configuration of another exemplary lithium secondary battery to which one embodiment of the present invention is applied.

FIG. 1B is a perspective view illustrating the schematic configuration of another exemplary lithium secondary battery 1 to which one embodiment of the present invention is applied. Referring to FIG. 1A, the lithium secondary battery 1 is also the so-called liquid-type battery and includes a cathode plate 2, an anode plate 3, separators 4, cathode tabs 5, anode tabs 6, and a core 7.

The lithium secondary battery 1 illustrated in FIG. 1B is configured such that an internal electrode formed through winding, onto the core 7, of a stack of the cathode plate 2, the separators 4, and the anode plate 3, and the electrolytic solution are liquid-tightly sealed in a specific cell casing (not shown).

2. Configuration of Cathode

Figure 2A:
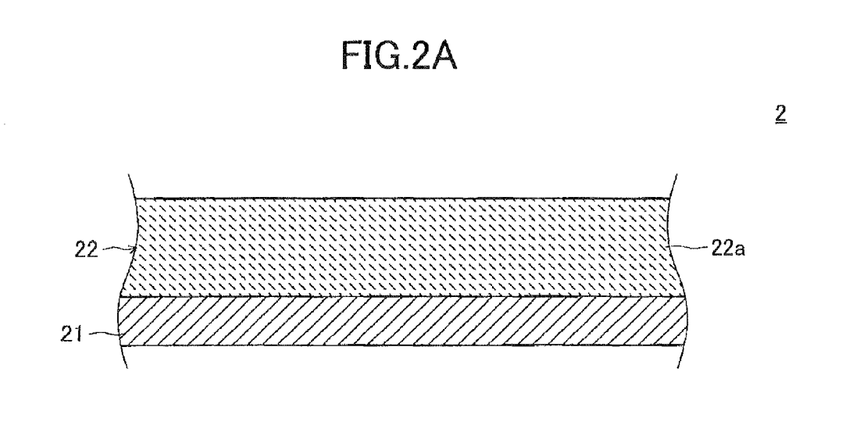
FIG. 2A is an enlarged sectional view of an exemplary cathode plate illustrated in FIG. 1A and FIG. 1B.
Figure 2B:
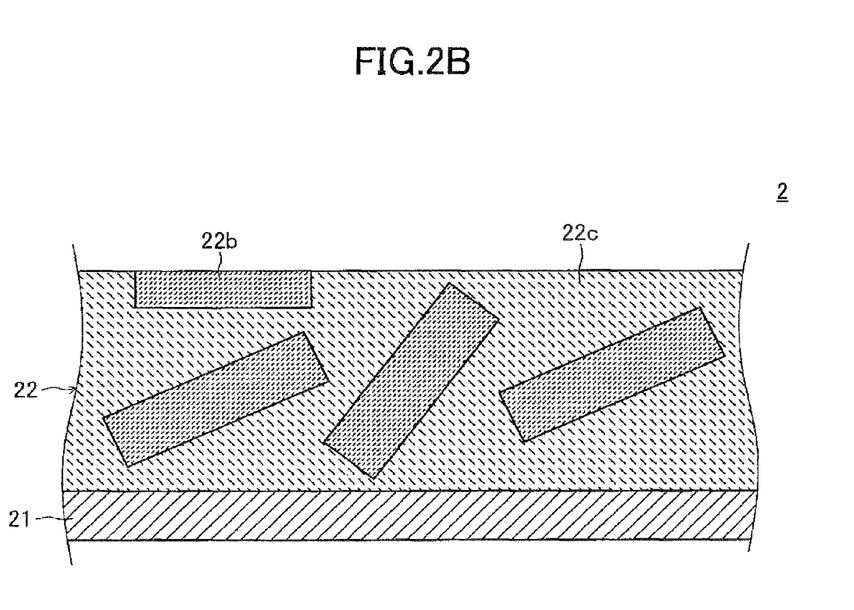
FIG. 2B is an enlarged sectional view of another exemplary cathode plate illustrated in FIG. 1A and FIG. 1B.

FIG. 2A and FIG. 2B is each an enlarged sectional view of the exemplary cathode plate 2 illustrated in FIG. 1A and FIG. 1B. Referring to FIG. 2A and FIG. 2B, the cathode plate 2 includes a cathode collector 21 and a cathode active material layer 22. That is, the cathode plate 2 is formed in a state in which the cathode collector 21 and the cathode active material layer 22 are joined to (stacked on) each other.

In FIG. 2A, the cathode active material layer 22 includes a cathode active material film 22a, which is a self-supported film formed of a sintered cathode active material. The "self-supported film" as used herein refers to a film that can be handled in itself after formation (typically, after sintering). In FIG. 2B, the cathode active material layer 22 includes cathode active material particles 22b, which are particles formed of a sintered cathode active material, and a binder 22c, which supports the cathode active material particles 22b in a dispersed state and contains a conductive additive.

Figure 3:
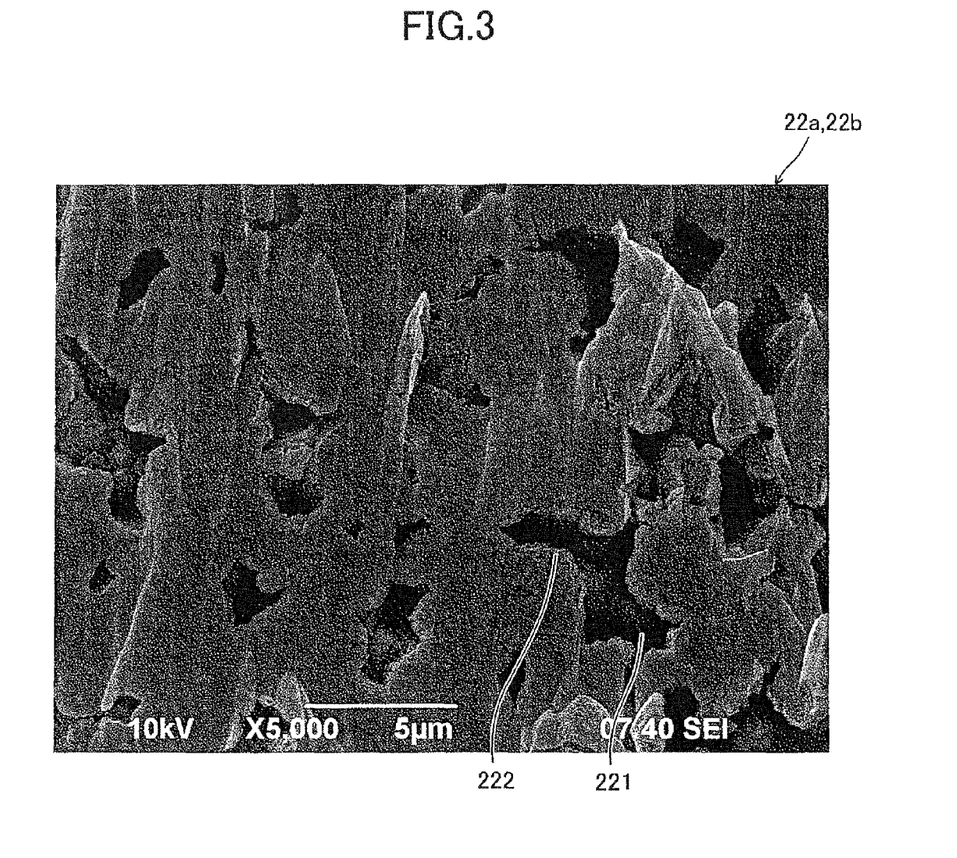
FIG. 3 is a scanning electron microscope photograph of a cross-section of a cathode active material film illustrated in FIG. 2A or a cathode active material particle illustrated in FIG. 2B.

FIG. 3 is a scanning electron microscope photograph of a cathode active material film 22a illustrated in FIG. 2A and a cathode active material particle 22b illustrated in FIG. 2B. As shown in FIG. 3, the cathode active material film 22a and the cathode active material particle 22b have formed therein a large number of pores 221. Further, the inner wall of each of such pores 221 is coated with a conductive film 222.

The conductive film 222 is formed as a continuous thin film on the inner wall of each of the pores 221. That is, a space capable of housing an electrolyte (electrolytic solution) is formed on the "inner" side of the conductive film 222 in the pores 221. It should be noted that, as a material for the conductive film 222, there may be used an electron-conductive material (such as carbon, a metal, or a conductive polymer) or an ion-conductive material (such as an ion-conductive polymer).

3. Specific Example of Production Method

Hereinafter, a specific example of a production method for a cathode active material (cathode active material film 22a illustrated in FIG. 2A and/or cathode active material particle 22b illustrated in FIG. 2B) according to this embodiment is described in detail.

(1) Preparation of Slurry 75.1 parts by weight of NiO powder (particle diameter: 1 to 10 μm, product of Seido Chemical Industry Co., Ltd.), 21.5 parts by weight of $Co_3O_4$ powder (particle diameter: 1 to 5 μm, product of Seido Chemical Industry Co., Ltd.), and 3.4 parts by weight of $Al_2O_3$ powder (particle diameter: 1 to 10 μm, product of Showa Denko K.K.) were pulverized and mixed together. The pulverized mixture was thermally treated in an air atmosphere at 1,000° C. for 5 hours to synthesize $(Ni_{0.75}, Co_{0.2}, Al_{0.05})O$ powder.

100 parts by weight of the $(Ni_{0.75}, Co_{0.2}, Al_{0.05})O$ powder synthesized as described above and then further pulverized with a pot mill, 100 parts by weight of a dispersion medium (toluene:isopropanol=1:1), 10 parts by weight of a binder (polyvinyl butyral: product of Sekisui Chemical Co., Ltd., product No. "BM-2"), 4 parts by weight of a plasticizer (di (2-ethylhexyl)phthalate (DOP): product of KUROGANE KASEI Co., Ltd.), 2 parts by weight of a dispersant (product of Kao Corporation, product name "RHEODOL SP-O30"), and 13 parts by weight of a pore-forming agent (PMMA: product of Soken Chemical & Engineering Co., Ltd., product No. "MX-80H3WT") were mixed together. The mixture was stirred under reduced pressure for defoaming, and the viscosity thereof was adjusted to 3,000 to 4,000 cP (the viscosity was measured with an LVT-type viscometer (product of Brookfield Co., Ltd.)).

(2) Sheet Forming

The thus prepared slurry was formed into a sheet-like compact on a PET film by a doctor blade method so that the thickness of the compact after drying was 50 μm.

(3) Calcination

The sheet-like compact peeled from the PET film was cut out into a size of 50 mm square with a cutter, placed at the center of a zirconia-made setter subjected to embossing processing, and calcinated in an air atmosphere at a predetermined temperature (immediate sintered body sintering temperature) for 3 hours. Then, the temperature was decreased to room temperature at 200° C./h.

(4) Lithium Incorporation

LiOH powder (product of Kanto Chemical Co., Inc.) was applied onto the thus obtained $(Ni_{0.75}, Co_{0.2}, Al_{0.05})O$ ceramics sheet so as to have a molar ratio of Li/(NiCoAl)=1.1, and the resultant was thermally treated in an oxygen atmosphere (0.1 MPa) at 750° C. for 10 hours to afford a "self-supported film"-like $Li_{1.0}(Ni_{0.75}Co_{0.2}Al_{0.05})O_2$ ceramics plate including therein pores.

(5) Conductive Film Coating

The resultant "self-supported film"-like $Li_{1.0}(Ni_{0.75}Co_{0.2}Al_{0.05})O_2$ active material film was partially immersed in a carbon dispersion liquid (mixture of acetylene black:PVDF:NMP=1:1:10), and the dispersion liquid was impregnated into the pores by capillary attraction. Further, active material film was fully immersed in a carbon dispersion liquid under a reduced pressure condition (−0.1 MPa). Subsequently, the ceramics plate taken out from the dispersion liquid was dried under an inert atmosphere at 120° C. for 1 hour to afford a cathode active material plate in which the inner wall of each of the pores was uniformly coated with a carbon coating film, 4. Evaluation An evaluation method for the cathode active material produced by the production method according the specific example and the evaluation results are described below.

(1) Porosity

The "porosity" refers to a value calculated from a relative density (porosity(%)=100-relative density). The relative density is a value determined by dividing a bulk density of a sintered body plate, which is determined by an Archimedes method, by a true density determined using a pycnometer. In the measurement of the bulk density, in order to sufficiently remove air present in pores, a sample was subjected to boiling treatment in water. The porosity of the cathode active material produced by the production method according the specific example was 20%.

(2) Coating Amount

A 5-mg sample was collected from the cathode active material film produced by the production method according the specific example, and the collected sample was placed in a platinum-made sample pan and subjected to TG-DTA measurement (temperature increase from room temperature to 1,000° C. at 1° C./min under an oxygen atmosphere). On the basis of an amount of weight loss from room temperature to 600° C. in this case, a coating amount (ratio of a mass of a carbon conductive film to a mass of a cathode active material plate: % by weight) was determined. The resultant coating amount was 5% by weight.

Also, a suitable amount of sample was collected from the cathode active material film produced by the production method according the specific example. This sample was embedded in resin and polished by Ar ion milling so as to prepare for cross-section observation. Then a SEM images were acquired for this prepared sample. Based on an acquired image, thickness of the conductive film (carbon coatings) were measured at four points in each of one particle. "An average thickness of the conductive film" was obtained by calculation of the average of the measured four values. Obtained average thickness was 236 nm.

Also, a percentage of coverage of periphery (except void) of the particles by the conductive film was evaluated as coverage of outer surfaces. Obtained coverage was 35%.

Additionally, a sample, which was collected from the cathode active material film produced by the production method according the specific example, was subjected to surface SEM observation. Opening coverage (%) was evaluated base on the observed image by calculating the percentage of the number of the pores whose openings were closed by the conductive film out of all pores (open pores) which were seen on the surface. Obtained opening coverage was 30%.

(3) Cell Characteristics

For evaluation of cell characteristics (rate characteristic and cycle characteristic), a coin cell for evaluation was produced in the following manner.

A cathode active material layer having a diameter of about 16 mm and a circular shape was formed by subjecting the cathode active material film produced by the production method in the specific example to punching processing. Au was sputtered on one surface of the formed cathode active material layer to form a cathode collector (thickness: 500 Å), to thereby produce a cathode plate. The thus produced cathode, an anode formed of a lithium metal plate, stainless-steel collector plates, and a separator were arranged in the order of collector plate-cathode-separator-anode-collector plate. The stacked product was filled with an electrolytic solution to produce a coin cell. The electrolytic solution was prepared by dissolving $LiPF_6$ in an equivolume mixture of ethylene carbonate (EC) and diethyl carbonate (DEC) serving as an organic solvent to a concentration of 1 mol/L.

(3-1) Rate Characteristic

The cell was evaluated as follows. One cycle includes the following charge and discharge operations: constant-current charge is carried out at 0.1 C rate of current until the cell voltage becomes 4.3 V; subsequently, constant-voltage charge is carried out under a current condition of maintaining the cell voltage at 4.3 V, until the current drops to ½0, followed by 10 minutes rest; and then, constant-current discharge is carried out at 0.1 C rate of current until the cell voltage becomes 2.5 V, followed by 10 minutes rest. A total of two cycles were performed under a condition of 25° C., and the discharge capacity as measured in the second cycle was defined as "discharge capacity at 0.1 C rate of current." Subsequently, a discharge capacity at 1 C rate was measured by repeating the same charge and discharge operation except that only the discharge condition was set to 1 C rate of current. Then, a value in terms of percentage obtained by dividing the discharge capacity at 1 C rate of current by the discharge capacity at 0.1 C rate of current was defined as rate characteristic (percent rate capacity retention). The resultant rate characteristic was 95%.

(3-2) Cycle Characteristic

The cell was subjected to cyclic charge-discharge at a test temperature of 25° C. The cyclic charge-discharge repeats 50 times: (1) charge at 1 C rate of constant current and constant voltage until 4.3 V is reached, and (2) discharge at 1 C rate of constant current until 2.5 V is reached. A value in terms of percentage obtained by dividing the discharge capacity of the cell as measured after 50 repetitions of cyclic charge-discharge by the initial discharge capacity of the cell was defined as cycle characteristic (percent cycle capacity retention). The resultant cycle characteristic was 96%.

(4) Relationship Between Coating Amount and Battery Characteristics

In the production method in the specific example, examples in each of which a coating amount was changed by changing the carbon amount in the carbon dispersion liquid (Experimental Examples 1 and 2) and an example in which coating with the carbon conductive film was not carried out (Comparative Example 1) were also evaluated in the same manner as described above. Table 1 shows the evaluation results. It should be noted that in Table 1, Experimental Example 3 corresponds to the production method in the specific example.

TABLE 1

|  | Porosity [%] | Coating amount [% by weight] | Rate characteristic [%] | Cycle characteristic [%] |
| --- | --- | --- | --- | --- |
| Comparative Example 1 | 20 | 0 | 70 | 80 |
| Example 1 | 20 | 1 | 80 | 88 |
| Example 2 | 20 | 3 | 90 | 93 |
| Example 3 | 20 | 5 | 95 | 96 |

As apparent from Table 1, remarkably improved rate characteristic and cycle characteristic were obtained in Experimental Examples 1 to 3 in each of which coating with the carbon conductive film was carried out as compared to Comparative Example 1 in which coating with the carbon conductive film was not carried out.

5. Effect of Configuration According to Embodiment

As described above, the configuration according to this embodiment can achieve both of excellent rate characteristic and practically sufficient durability (cycle characteristic) in the lithium secondary battery 1. In particular, in the lithium secondary battery 1 having a configuration as illustrated in FIG. 1B, even if a crack occurs in the cathode active material during winding around the core 7 as a center, a reduction in capacity due to the occurrence of such crack is suppressed to the greatest possible extent, and satisfactory cycle characteristic is provided as well.

It should be noted that, in the configuration described in Japanese Patent Application Laid-open No. 2009-117241, unlike the configuration according to this embodiment (the present invention), a conductive fine powder is filled into pores (voids). Thus, an electrolytic solution is spatially eliminated by the conductive fine powder filled in the pores, and diffusion of lithium ions is inhibited. Further, a discontinuous conductive fine powder filled in the pores has low conductivity unlike the continuous conductive film according to this embodiment (the present invention). Thus, the configuration described in such literature does not provide satisfactory characteristic as provided by the configuration according to this embodiment (the present invention).

6. Examples of Modifications

It should be noted that the above-mentioned embodiment and specific examples are, as mentioned above, merely illustrative of exemplary embodiments tentatively considered to be the best modes by the applicant of the present invention at the time of filing of the present application. As a matter of course, the embodiment and specific examples should not be construed as limiting the present invention. Accordingly, it is natural that various modifications to the embodiment and specific examples can be made so long as an essential part of the present invention is not altered.

Hereinafter, several modifications are exemplified. In the following descriptions of the modifications, component members similar in structure and function to those of the above-mentioned embodiment are denoted by names and reference numerals similar to those of the embodiment in the modifications as well. In addition, the description of the embodiment may be appropriately incorporated into the descriptions of the component members so long as there is no inconsistency.

It goes without saying that even modifications are not limited to those described below. Limitingly construing the present invention based on the above-mentioned embodiment and the following modifications unfairly impairs the interests of an applicant (particularly, an applicant who is motivated to file as quickly as possible under the first-to-file system) while unfairly benefiting imitators, and is thus impermissible.

It also goes without saying that the structure of the above-mentioned embodiment and the structures of the following modifications to be described below are entirely or partially applicable in appropriate combination so long as there is no technical inconsistency.

The configuration of a lithium secondary battery 1 to which the present invention is applied is not limited to the above-mentioned configuration. For example, the present invention is not limited to the so-called liquid type battery configuration. That is, for example, a gel polymer electrolyte, a polymer electrolyte or an inorganic solid electrolyte may be used as the electrolyte. Further, the cathode active material which may be utilized in the present invention is not limited to the composition illustrated in the specific example.

As described in the specific examples, "coating amount", that is, the content of the conductive film 222 in the cathode active material film 22a or the cathode active material particles 22b is adjustable by, for example, changing amount of carbon in the carbon dispersion. In this case, the content may preferably be adjusted so that it falls within the range of 0.01 to 5 wt %

In the above-mentioned specific examples, acetylene black as the conducting substance and PVDF as the organic binder were contained at a rate of 1:1 in the conductive film 222. That is, the organic binder content of the conductive film 222 was approximately 50 wt % in the above-mentioned specific examples. However, the present invention should not be limited to this feature. Namely, the organic binder content can be suitably adjusted by changing mixture ratio at the conductive film coating step. In this case, the content may preferably be adjusted so that it falls within the range of 1 to 60 wt %.

The average thickness of the conductive film is also adjustable by changing mixture ratio (more specifically, changing the amount of solvent) at the conductive film coating step. That is, the conductive film can be thinner by increasing the amount of NMP in the carbon dispersion liquid at the above-mentioned specific examples. On the other hand, the conductive film can be thicker by decreasing the amount of NMP in the carbon dispersion liquid at the above-mentioned specific examples. In this case, the average thickness of the conductive film may preferably be adjusted so that it falls within the range of 30 to 1000 nm.

The coverage is also adjustable by changing portion of immersion (more specifically, changing the amount of solvent) when the active material particles or films are partially immersed in the carbon dispersion liquid at the conductive film coating step. More specifically, it is adjustable by changing the percentage of the outer surface of the active material particle or film which is immersed in the carbon dispersion liquid. In this case, the coverage may preferably be adjusted to 50% or less.

Opening coverage is also changeable by changing drying temperature when the ceramics plate taken out from the dispersion liquid is dried under an inert atmosphere at the conductive film coating step. More specifically, in case that drying temperature is high, solvent is rapidly volatilized and the dispersion liquid is immediately dried. Therefore, in this case, the proportion of the pores whose openings are covered by the conductive film should be increased. On the other hand, in case that drying temperature is low, solvent is gradually volatilized and the dispersion liquid is being dried with wetting the inner wall of the pore. Therefore, in this case, the proportion of the pores whose openings are covered by the conductive film should be decreased.

Figure 4:
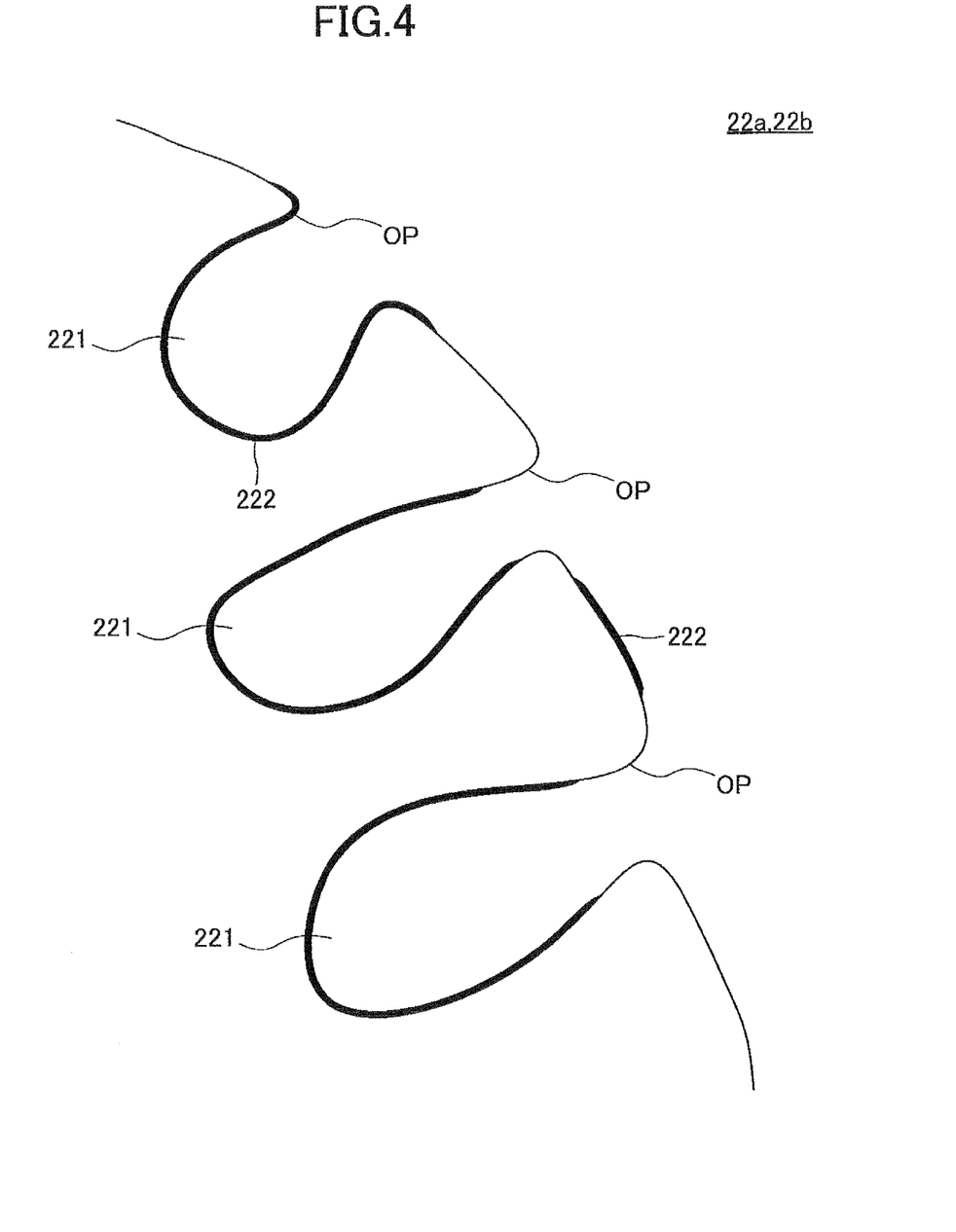
FIG. 4 is an enlarged sectional view (a schematic view) around an outer surface of the cathode active material film illustrated in FIG. 2A or the cathode active material particle illustrated in FIG. 2B.

FIG. 4 is an enlarged sectional view (a schematic view) around an outer surface of the cathode active material film 22a illustrated in FIG. 2A or the cathode active material particle 22b illustrated in FIG. 2B. The opening OP of the pore 221 may be covered by the conductive film 222 as shown in FIG. 4.

In this case, the proportion of the pores 221 whose openings OP are covered by the conductive film 222 based on the total number of the numerous pores 221 preferably falls within the range of 1 to 50%. On account of this, shape holding performance of the conductive film 222 is enhanced with preventing degradation of diffusion of lithium ions. Therefore, satisfactory rate and cycle characteristics are both provided.

The conductive film coating step of the above-mentioned specific examples can be changed to a step of spraying a carbon dispersion under an inert atmosphere at 500° C. provided that methanol is used as the solvent instead of NMP. As a result of this, amorphous carbon is included in the conductive film instead of crystalline carbon.

In the meantime, "acetylene black" is used as the conducting substance and this is a powder of particles having nearly sphere shape. Alternatively, fibrous material may be used as the conducting substance.

Figure 5:
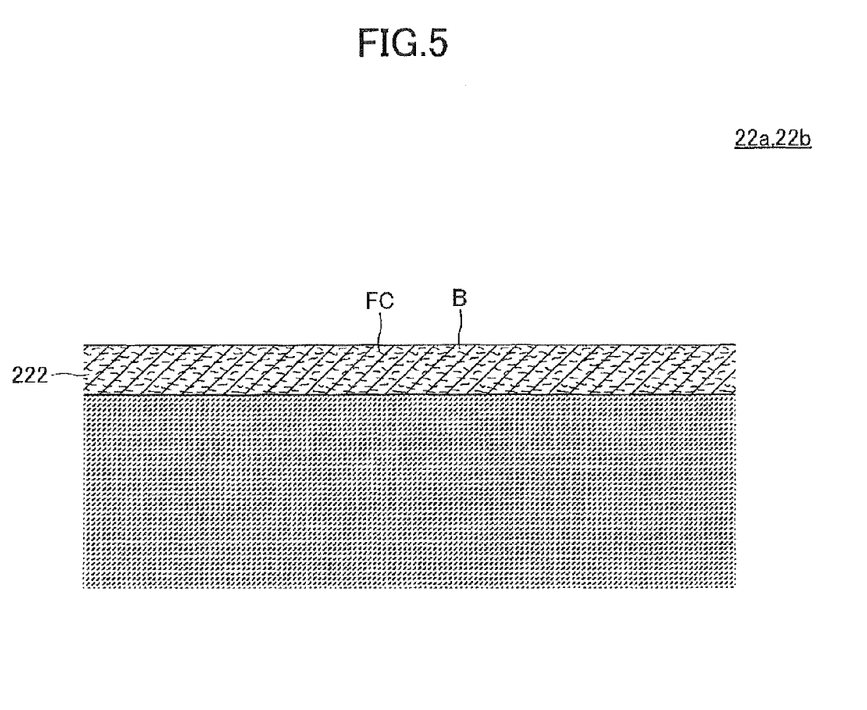
FIG. 5 is an enlarged sectional view (a schematic view) of a modification of a conductive film.

FIG. 5 is an enlarged sectional view (a schematic view) of a conductive film 222 of this modification. As shown in FIG. 5, this conductive film 222 has such a configuration that fibrous carbon components FC are dispersed in an organic binder B. By virtue of this configuration, shape holding performance of the conductive film 222 should be enhanced. As a result, cycle characteristic should be improved.

Referring to FIG. 2A, the cathode active material layer 22 may be formed into a seamless plate (self-supported film). Alternatively, the cathode active material layer 22 may be obtained by two-dimensionally disposing or binding a large number of cathode active material plates.

The present invention is by no means limited to the specific production method described above. That is, for example, the forming method is not limited to the method described above. Further, the lithium incorporation step may be omitted by appropriately selecting a raw material before the forming.

In addition, it is natural that modifications of which no particular mention is made are also encompassed in the technical scope of the present invention so long as an essential part of the present invention is not altered.

Further, the component members of the means for solving the problems of the present invention, which are illustrated with respect to operations and functions, encompass not only the specific structures disclosed in the above-mentioned embodiment and modifications but also any other structures that can realize the operations and functions. In addition, the contents (including specifications and drawings) of the prior application and publications cited herein can be appropriately incorporated as components of the specification.

What is claimed is:

1. The cathode active material for a lithium secondary battery, comprising a cathode active material having open pores therein, each open pore of the cathode active material being formed by a single continuous surface that includes an inner wall coated with a conductive film.

2. The cathode active material for a lithium secondary battery according to claim 1,
wherein a content of the conductive film falls within a range of 0.01 to 5 wt % based on the cathode active material.

3. The cathode active material for a lithium secondary battery according to claim 1,
wherein the conductive film contains a conducting substance and an organic binder, and
an organic binder content of the conductive film falls within a range of 1 to 60 wt %.

4. The cathode active material for a lithium secondary battery according to claim 1,
wherein an average thickness of the conductive film falls within a range of 30 to 1000 nm.

5. The cathode active material for a lithium secondary battery according to claim 1,
wherein a carbon component which comprises a conducting substance is fibrous.

6. The cathode active material for a lithium secondary battery according to claim 1,
wherein a carbon component which comprises a conducting substance is a crystalline carbon.

7. The cathode active material for a lithium secondary battery according to claim 1,
wherein the cathode active material is a particle or film, and coverage of an outer surface of the particle or film by the conductive film is 50% or less.

8. The cathode active material for a lithium secondary battery according to claim 1,
wherein a proportion of the open pores whose openings are covered by the conductive film based on a total number of the open pores falls within a range of 1 to 50%.

* * * * *